Sept. 7, 1937.    K. SCHWARZ    2,092,407
METHOD OF NOISELESS RECORDING
Filed June 26, 1935
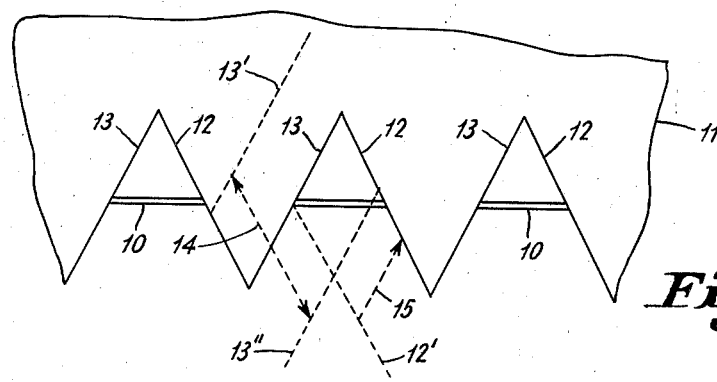
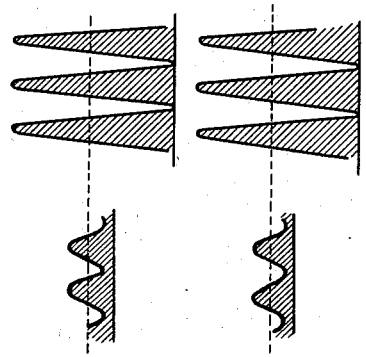
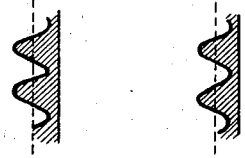
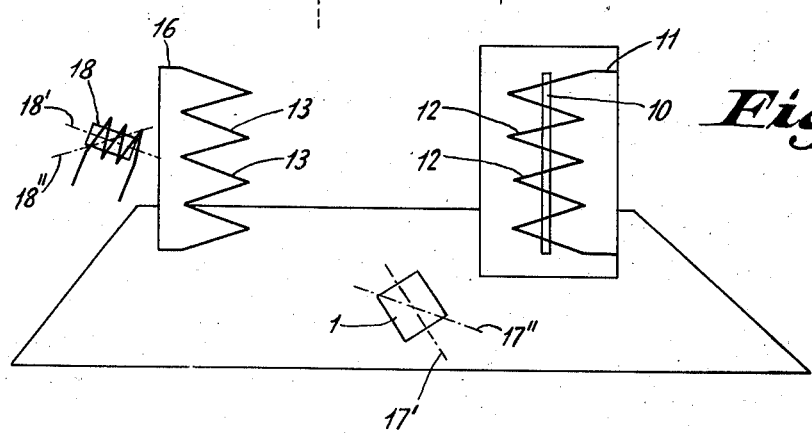
INVENTOR
KARL SCHWARZ
BY *H.S. Grover*
ATTORNEY Patented Sept. 7, 1937

2,092,407

UNITED STATES PATENT OFFICE 2,092,407

METHOD OF NOISELESS RECORDING

Karl Schwarz, Berlin, Germany, assignor to Klangfilm G. m. b. H., Berlin, Germany, a corporation of Germany Application June 26, 1935, Serial No. 28,418
In Germany December 19, 1934

3 Claims. (Cl. 179—100.3)

This invention relates to the production of sound records that are free from background noise. To this end the sound is recorded throughout the entire length of the record with a straight zero line and the average transparency or transmission of the record strip intended for reproduction is varied with the sound volume of the acoustic track. According to the invention this result is attained by projecting the image of a serrated or tooth-shaped mask or light stop on a light slit and moving this image in the direction of one of the tooth edges in accordance to the sounds to be recorded and in the direction of the other tooth edge in accordance with the volume or intensity of the sound.

The invention will be better understood from the following description when considered in connection with the accompanying drawing and its scope will be pointed out in the appended claims.

Referring to the drawing,

Figs. 1a, 1b and 1c are explanatory diagrams relating to an explanation of the invention, and Fig. 2 is a diagrammatic showing of a suitable embodiment of the invention.

Referring to Fig. 1a, 10 denotes a light slit in the plane of which the image of a serrated stop is projected. This image is caused to move in the direction of tooth-edge 12 in accordance with the acoustic vibrations to be recorded, and in the direction of tooth-edge 13 in accordance with a direct current which is obtained by rectification of part of the audio current and varies as the volume of the sound. In other words, edge 13 is caused to oscillate parallel to the sense of edge 12 between limiting positions 13' and 13" as indicated by the broken line, this variation being in accordance with an amplitude which corresponds to the sound volume of the acoustic action occurring at a given instant. By the said motion of edge 13, the illuminated length of slit is varied so that upon a recording strip such as a motion picture film moved transversely of the slit the area shown shaded in Fig. 1b is blackened. The left hand boundary of this area corresponds to the sound wave while the right hand boundary is a line which contains no oscillations. This line is produced by tooth-edge 12 which, for practically complete control of edge 13 as shown in Fig. 1b, is almost in a position illustrated in Fig. 1a. With decreasing volume of the sound the image 11 of the serrated stop is shifted in the direction of edge 13 in such a way that the tooth-edge 12, in the presence of zero volume will assume position 12' shown by broken line. With increasing amplitude of the acoustic oscillations to be recorded the tooth-edge 12 will be restored again from position 12' into the position indicated by solid lines in Fig. 1a. Fig. 1c shows what blackening is produced upon the recording strip when the acoustic volume is low. When the acoustic volume is low tooth edge 13 will be shifted but slightly in the sense of the broken-line double headed arrow 14, and the result is that the sound track upon the recording strip will be of but little amplitude. When the sound volume is low tooth edge 12 is shifted from its initial position 12' which it occupies in the presence of zero sound volume only a small distance in the direction of the broken-line arrow 15 so that the right hand boundary of blackened portions of the recording strip is shifted in proportion to the lower sound volume.

The zero line of the sound track, as can be seen from Figs. 1b and 1c is, however, the same whether the acoustic volume is large or small. Recording, therefore, takes place with a straight zero line irrespective of the sound volumes. With increasing sound volume of the sound record, the right hand boundary line of the blackened area is shifted approximately as far as the position indicated in Fig. 1b. In other words, the right hand boundary line, at constant sound volume, is parallel to the direction of film feed, though it forms a definite angle in reference to this direction upon the sound volume decreasing or increasing.

If a record, as in Figs. 1b and 1c, is copied or printed, then the mean transparency of the print which is suited for reproduction of the sound records will be so much smaller, the lower the recording sound volume.

To make a sound track as in Figs. 1b and 1c, recourse may be had to an arrangement as shown in Fig. 2. Referring to the latter, 16 denotes a serrated stop illuminated from the rear and imaged by way of a mirror 17 upon a slit-diaphragm 10. The image of the serrated stop, as in Fig. 1a, is designated by 11. The objective lens which produces imaging of serrated stop 16 upon the plane of slit 10 has been omitted in Fig. 2. Mirror 17 which may form a part of any appropriate type of oscillographic device upon which the audio impulses to be recorded are impressed oscillates about axis 17', so that the image of serrated stop 16 moves in the direction of edges 12 in accordance with the sound waves. The serrated stop 16 itself is shifted in the sense of edges 13 by action of a rectified component of the audio current supplied to an electromagnet 18 or other device suitable for moving the stop 16.

An arrangement according to this invention may also be so constructed that the serrated stop is stationary and that the mirror oscillating in accordance with the audio current is enabled to undergo a further vibration about another axis 17" which forms with axis 17', Fig. 2, the same angle as the two edges 12 and 13 of the serrated stop. Such an arrangement may be produced by pivotally supporting the oscillographic device of which mirror 17 forms a part in a manner to permit movement in the required direction, as shown, for example in Egerton Patent 1,605,930, Nicolson Patent 1,470,696, or Centano Patent 1,702,195.

The means to produce sound tracks finally could also be so designed that the serrated stop itself is capable of mobility in two directions axes 18' and 18", being parallel to the two tooth edges, and that this serrated stop by way of an objective lens is directly imaged into the plane of slit 10.

The serrated stop may preferably have tooth edges enclosing an angle of 90° with each other. This is conducive to lower electrical energy requirements for the oscillographic means controlling the mirror motions, as well as the means causing the shifting of the serrated stop itself. The serrated stop could also be furnished with teeth resembling those of a saw, that is, triangular, one edge of which is placed in the direction of travel of the recording film-strip, while the other one is positioned obliquely thereto.

I claim:

1. The method of sound recording which includes producing a light beam having angularly displaced edges, moving said beam in a direction parallel with one of said edges in accordance with said sound, and moving said beam in a direction parallel to another of said edges in accordance with the volume of said sound.

2. The combination of means defining a light slit, means for projecting on said slit a light beam having angularly displaced edges, audio current responsive means operable to move said beam in a direction parallel with one of said edges, and audio current volume responsive means operable to move said beam in a direction parallel with another of said edges.

3. The combination of means defining a light slit, means for projecting on said slit a triangularly-shaped light beam, current responsive means operable to move said beam in parallelism with one of said edges, and current volume responsive means operable to move said beam in parallelism with another of said edges.

KARL SCHWARZ.